United States Patent [19]
Frey

[11] Patent Number: 4,830,292
[45] Date of Patent: May 16, 1989

[54] SHREDDING MACHINE

[75] Inventor: Oscar M. Frey, Listowel, Canada

[73] Assignee: 683462 Ontario Ltd., Listowel, Canada

[21] Appl. No.: 63,482

[22] Filed: Jun. 18, 1987

[30] Foreign Application Priority Data

Jun. 20, 1986 [GB] United Kingdom ............... 8615074

[51] Int. Cl.$^4$ .......................................... A01F 29/00
[52] U.S. Cl. ............................ 241/101 A; 241/101.7; 241/186.4; 241/280
[58] Field of Search .................. 414/24.6; 241/101 A, 241/101.7, 186.2, 186.4, 194, 186 R, 277, 282.1, 282.2, 280

[56] References Cited

U.S. PATENT DOCUMENTS

| | | | |
|---|---|---|---|
| 3,208,491 | 9/1965 | Bliss | 241/280 X |
| 4,134,554 | 1/1979 | Morlock | 241/186 R X |
| 4,266,899 | 5/1981 | Skeem | 241/101 A X |
| 4,524,916 | 6/1985 | Keyes et al. | 241/101 A |
| 4,657,191 | 4/1987 | Dwyer et al. | 241/101 A X |

FOREIGN PATENT DOCUMENTS

| | | | |
|---|---|---|---|
| 1186598 | 5/1985 | Canada . | |
| 2100106 | 12/1982 | United Kingdom | 241/101 A |

Primary Examiner—Mark Rosenbaum
Attorney, Agent, or Firm—Anthony Asquith

[57] ABSTRACT

The disclosed machine is for shredding cylindrical hay-bales. The machine is provided with knife-type (as opposed to flail-type) shredder-blades. The blades (52) are mounted in a rotating cutter frame (38) which is positioned parallel to, and alongside, the hay-bale (34). The shredder-blades are pivotable on the frame, and fly outwards, ready for shredding, due to centrifugal force. A set of drive-rollers (43,45) rotates the bale past the blades. The shredder-blades are presented edge-on to the cylindrical surface of the bale. This presentation of the blades gives great efficiency and economy of shredding.

9 Claims, 2 Drawing Sheets

SHREDDING MACHINE

This invention relates to the manner in which shredding knives are arranged in a shredding machine. The invention is described as it applies to a hay-bale shredding machine, but the invention is not limited to hay-bale shredding.

BACKGROUND TO THE INVENTION

It has become the common practice for hay cut from the fields to be collected into round—ie. cylindrical—bales. Such bales are typically 1.5 meters in diameter, and 1.5 meters long. The bales weigh 500 kg or so.

The bales have to be disintegrated in some way before the hay can be used, for example for feeding animals. There are a number of devices presently available for disintegrating the bales.

It is possible in some circumstances to disintegrate a bale of hay simply by unrolling the bale. Unfortunately, the bale will only unroll easily if the hay is dry. Also, merely unrolling the hay tends to leave the hay in large strands and clumps, with the result that the animals have some difficulty in assimilating the hay.

Machines have been developed therefore for shredding the hay from the bale. The shredding action prepares the hay for the animals much more effectively than merely unrolling the bale.

The shredding action is provided by a rotary cutting which engages against the bale, and which tears the hay from the bale. The present invention is directed to a new manner of arranging the rotary cutter.

THE PRIOR ART

An example of a machine for merely unrolling the bale—ie a machine without any shredding or cutting action—may be seen in U.S. Pat. No. 4,195,958 (Vahlkamp), published Apr. 1, 1980.

In the machines that do shred the hay, the known rotary-cutters make use of a rotating frame on which the shredding-blades are mounted. The blades are so mounted in the frame that the blades fly outwards due to centrifugal force when the cutter is rotating.

The shredding-blades can be categorized into two types, i.e. the flail-type and the knife-type. In the flail-type, the blade is presented to the hay like a hammer, in that the cutting edge of the blade lies parallel to the rotary axis of the cutter. In the knife-type, the cutting edge of the blade lies along a radius of the rotating cutter, so that the knife-type blade slices the hay like a knife.

An example of the centrifugal flail-type blades may be seen in FIG. 3 of CA No. 1186598 (Morlock), published May 07, 1985 or in U.S. Pat. No. 4,448,361 (Marcy) published May 15, 1984. An example of the centrifugal knife-type blades may be seen in U.S. Pat. No. 3,966,128 (Anderson), published June 29, 1976.

Both the flail-type blades and the knife-type blades are well-known in farm machinery for other purposes besides hay-bale shredding. An example of such other uses is in chopping un-baled straw from a combine-harvester, U.S. Pat. No. 4,218,022 (Boehm) Aug. 19, 1980. Another example is U.S. Pat. No. 2,952,466 (Carlson) Sept. 13, 1960, which shows half flail-type, half knife-type, centrifugal blades, for disintegrating and spreading manure.

It is also possible to categorize the ways in which the rotary cutters have been disposed on the machine with respect to the hay-bale itself.

In MORLOCK, for example, the rotary cutter is disposed with its rotary axis parallel to the axis of the bale, so that the cutter acts against the cylindrical surface of the bale. In ANDERSON, the rotary cutter is so disposed as to cut along the end face of the bale.

In both examples, a means is provided for causing the bale to rotate past the blades of the cutter. In ANDERSON, the bale is placed in a tub, and the cylindrical walls of the tub are made to rotate. The floor of the tub, however, does not—and cannot—rotate. In MORLOCK, the bale is rotated by virtue of the fact that the bale rests on a belt or chain conveyor.

It has been found that the previously-known ways of arranging the blades and the previous ways of mounting the cutter with respect to the bale, do not lead to effective, reliable, shredding of the bales.

The invention provides a new way of arranging the cutter, which is aimed at making it almost certain that the bale will be shredded quickly and easily, no matter what state the bale is in.

GENERAL DESCRIPTION OF THE INVENTION

In the invention, the shredder-blades are of the knife-type, not the flail-type, ie. the cutting edges of the blades are presented "edge-on" to the hay. Also in the invention, the rotary cutter is disposed with its rotary axis parallel to, and alongside, the cylindrical surface of the bale. For the purposes of this specification, such a disposition of the cutter-frame with respect to the hay-bale is referred to as a "tangential" disposition of the cutter. It may be noted that MORLOCK shows such a tangetial disposition of the cutter.

A means is provided for rotating the bale past the edge-on blades.

This combination of the "edge-on" blades with the tangential disposition of the cutter-frame, has been found, in the invention, to lead to a huge reduction in the amount of power needed to disintegrate a bale. The following explanation is offerred as to why this should be so.

The "edge-on" knife-type blades can be allowed to cut into the bale far more deeply than can the flail-type blades. If the flail-type blades were allowed to cut deeply into the bale, the cutter would easily stall if the blades were to strike any but the lightest of obstructions in the bale.

Besides that, it is recognised in the invention that the flailing action is not necessary, even when the hay is dry, to cut the hay up properly for the animals. In fact, the slicing action produced by the "edge-on" knives tends to produce a soft, fluffed-up, texture to the hay which is not achieved by other ways of disintegrating the bale.

Thus, it is recognised in the invention that flailing the hay requires far more power than is necessary, and also that flailing the hay produces hay of the wrong texture.

It is a requirement that the cutter be set to rotate at high speed. The upper limit on the speed is compromised by the fact that the shaft has to be mounted in adequately supported bearings. In order to render the cutter suitable for high speed rotation, it would simplify matters if the cutter shaft could be supported at an intermediate point. The heavier and more robust the cutter, the greater the need for intermediate support. However, it would be rather expensive to place another bearing halfway along the length of the cutter, in addition to the bearings at the ends of the cutter spindle.

The cutter therefore needs to be as light as possible, and to be subject only to light forces, if the cutter is to be set to rotate at a high speed.

When the cutter is disposed along the cylindrical surface of the bale, the cutter of course has to be as long as the bale. That is to say, the cutter has to be 1.5 meters or so in length.

Therefore, the cutter, in the invention, is long, and yet preferably the cutter is supported only by the two bearings at the ends of the cutter spindle. This is only possible if the forces on the cutter frame are kept light. Also, the cutter of the invention may be set to cut deeply into the bale—this again is only possible if the cutter forces are kept light. For the most effective and efficient shredding the cutter should rotate at high speed—which again is only possible if the cutting forces are kept light.

These are the reasons why it is better to align the blades in edge-on, knife-type presentation to the bale, when the cutter-frame is disposed tangentially with respect to the bale.

It has been known to place the blades in the edge-on, knife-type presentation when the cutter is let into the floor of a tub-type shredder, as shown in ANDERSON for example. In a tub-type shredder, however, the weight of the bale is taken mainly by the floor of the tub, not by the cutter. There is therefore a limit to how hard the bale can be pressed into the cutter and there is a corresponding limit to the distance the bale can be pressed into the cutter.

Also, in the tub-type of shredder, the cutter is not long—the cutter has a length of rather under half the diameter of the bale. Thus the cutter has a length of around 0.7 meters. There is no real difficulty in providing adequate bearings for a cutter that is only 0.7 meters long.

Another aspect of the tub-type of shredder may be contrasted with the invention. In the tub-type of shredder, the edge-on knives are cutting against the flat end surface of the cylindrical bale. This may be contrasted with the situation in the invention, where the edge-on knives cut tangentially against the cylindrical surface of the bale.

The bale was made by rolling the hay in cylindrical (or, strictly-speaking, spiral) form. It is recognised in the invention that it is much easier therefore to dislodge the hay from the cylindrical surface than to dislodge hay from the flat end surface. The exposed strands of hay at the end surface tend to be woven together and to be more tightly packed, as compared with the hay at the cylindrical surface.

This difference in the ease of shredding—between cutting the cylindrical-surface, or cutting the flat end-surface—remains the same throughout the shredding process, since in both cases the new hay that is exposed as hay is cut away from the bale is in the same orientation as the hay just cut, right until the bale has almost gone.

When the cutting blades are arranged in the flail-type configuration, the blades cannot be allowed to dig too deeply into the bale. When the cutting blades are arranged in the edge-on configuration, as in the invention, the blades can be allowed to dig comparatively much more deeply into the bale.

It is recognised in the invention that disposing the edge-on, knife-type, blades in the tangential cutting relationship to the bale, can provide an improvement in shredding efficiency and economy. It is recognised that this improvement is not present when knife-type blades are used in other configurations, and is not present when the cutter-frame is provided with other kinds of blades.

DETAILED DESCRIPTION OF PREFERRED EMBODIMENT

The invention will now be further illustrated by the description of an example of a shredding machine which incorporates the invention. The exemplary machine is shown in the accompanying drawings, in which.

The hay-bale shredding machine comprises a machine frame 30, which is mounted on wheels and is suitable for towing behind an agricultural tractor. (The invention however is also applicable to self-powered and static shredding machines. And the machine of the invention may be used for shredding other materials, such as paper.)

The machine frame 30 carries a receptacle 32, which is sized to receive a spirally rolled hay-bale 34. The hay-bale 34 lies in the receptacle 32 with the axis 36 of the bale 34 disposed horizontally, and longitudinally with respect to the machine.

Figure 1:
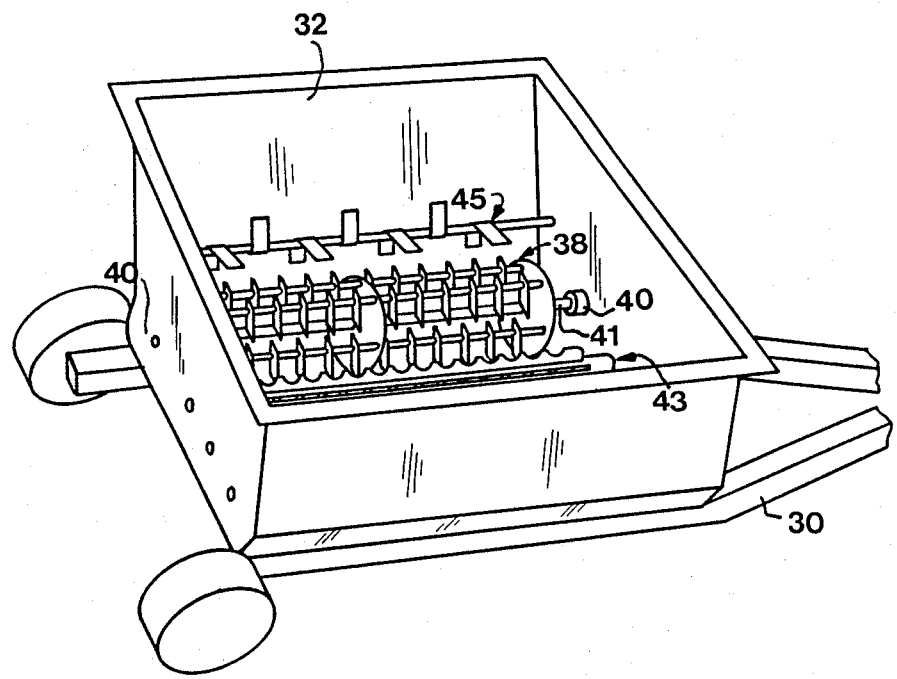
FIG. 1 is a pictorial view of an exemplary shredding machine.
Figure 3:
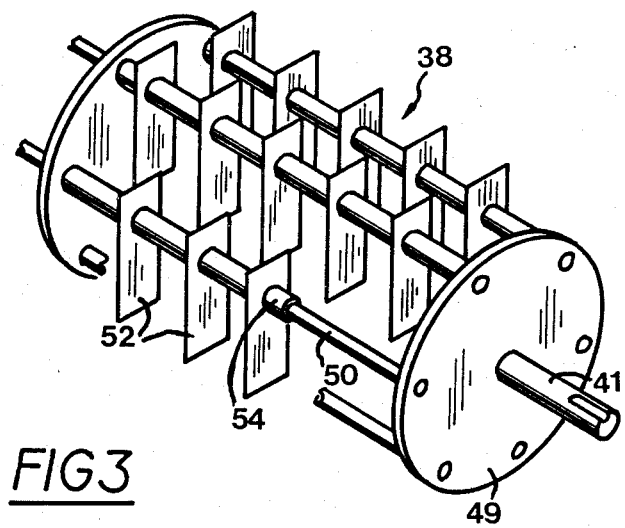
FIG. 3 is a pictorial view of a cutter assembly of the machine.
Figure 2:
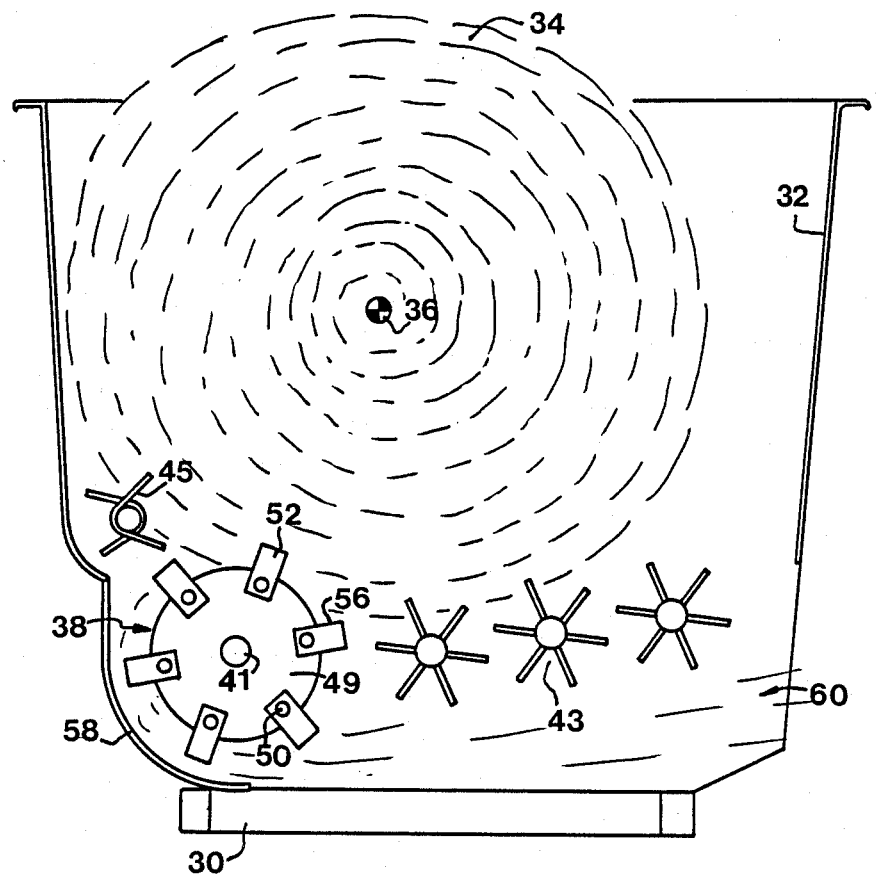
FIG. 2 is a cross-sectional elevation of the machine.

A cutter-frame 38 is mounted at the bottom of the receptacle 32, in end bearings 40 disposed one at each end of the spindle 41. Drive-rollers 43 are arranged alongside the cutter-frame 38, with their axes parallel to that of the cutter-frame. In the machine shown in FIG. 2, the receptacle 32 has no floor as such, in that the hay-bale 34 within the receptacle rests on the drive-rollers 43.

An extra drive roller 45 is located on the other side of the cutter-frame 38. The receptacle 32 is provided with slats 47, to guide the hay-bale in the vicinity of the extra roller 45. All the drive-rollers 43,45 are geared together, and are driven from a hydraulic motor, which is under the control of the tractor operator.

The cutter-frame 38 is driven from the power-take-off shaft of the tractor. It may be noted that the drive-rollers can be reversed, using the hydraulic motor, while the cutter-frame continues its normal rotation. This is important when trying to clear a jammed bale—the cutter-frame has a considerable inertia, so there would be a noticeable delay if the cutter-frame also had to change direction.

The cutter-frame 38 includes a number of hexagonal flanges 49, which are unitary with the spindle 41. Six rods 50 also connect the flanges 49, so that the cutter-frame 38 resembles a squirrel cage. Shredder-blades 52 are mounted loosely on the rods 50, and are spaced apart with spacers 54.

When the cutter-frame 38 is rotated, the shredder-blades 52 fly outwards due to centrifugal force. The cutter-frame is driven by a drive coupled to the Power-Take-Off shaft of the tractor. The drive rollers are driven independently by a hydraulic motor. Thus, if the bale should jam, or stop rotating, the drive-rollers can be reversed momentarily, without stopping the cutter.

Each shredder-blade 52 is made of a flat piece of steel, which is sharpened to a cutting-edge along one of its side-edges 56. The blades 52 all lie in planes that are radial relative to the spindle 41 of the cutter-frame 38.

When the cutter-frame 38 rotates, the shredder-blades 52 cut into the cylindrical surface of the bale 34, in a tangential direction. The shredded strands of hay follow the cutter-frame 38 around, and are guided by the shroud 58. The shredded hay is ejected from the mouth 60.

The spacers 54 may be of different lengths so that the blades 52 cover different parts of the cylindrical surface of the hay-bale.

The rods 50 are well-spaced radially from the spindle 41. This gives rise to a benefit. Hay-bales are often tied up with twine, and it is a problem with many shredding machines that the twine becomes entangled around the cutter spindle and stalls the machine. It can be very difficult to remove the tangled twine.

In the cutter-frame shown, the tendency for twine to become caught in the cutter-frame is reduced, because the centrifugal force on such twine at the radius of the rods 50 is appreciable, and the centrifugal force flings any stray pieces of twine aside before they can become entangled.

In the invention, the blades 52 can be set so as to dig deeply into the hay-bale, in the radial direction.

Occasionally, the blades will strike an obstruction, such as a pebble, or a lump of solid ice if the bale has been standing outside in winter. The impact on the blade on these occasions is limited by the fact that the blade can pivot aside on the rod 50.

The fact that the rods 50 are set at a large radius leads to another advantage. The blades 52 can rotate in complete circles without striking other blades, nor the spindle 41 nor the neighbouring rods 50. Therefore, little energy is lost in the impact, and the blade immediately regains its outflung position, and also the noise is reduced.

But in general, in the invention, since the blade is cutting into the bale in the direction in which the hay was wound into the bale, the force on the blades is low, even though the blades are cutting deeply. This low force, and therefore low power requirement, may be contrasted with the force on the blades when the blades are of the flail-type. In that case, the power needed to drive the cutter-frame is much higher, even though the blades cannot be allowed to dig so deeply into the hay.

I claim:

1. Hay-bale shredding machine, characterised:
   in that the machine includes a receptacle (32) which is suitable for receiving a cylindrical hay-bale (34);
   in that the machine includes a drive-means (43,45) which is effective to drive a hay-bale placed in the receptacle in rotation about its cylindrical axis;
   in that the machine includes a cutter-frame (38);
   in that the cutter-frame is mounted on bearings (40) for rotation with respect to the frame (30) of the machine;
   in that the axis of rotation (41) of the cutter-frame is parallel to the cylindrical axis (36) of the hay-bale;
   in that the drive-means is so disposed as to drive the cylindrical surface of the hay-bale into tangential engagement with the cutter-frame;
   in that the cutter-frame is furnished with many shredder-blades (52);
   in that each shredder-blade comprises a respective flat piece of metal, one of the side edges (56) of which constitutes a cutting-edge;
   and in that each shredder-blade is so disposed that the plane of the blade lies radially, relative to the axis of the cutter-frame.

2. Machine of claim 1, further characterised:
   in that the drive-means (43,45) is so positioned as to keep the axis (36) of the hay-bale horizontal as the hay-bale is shredded;
   and in that the axis (41) of the cutter-frame is horizontal.

3. Machine of claim 1, further characterised:
   in that each shredder-blade (52) is mounted for pivoting with respect to the cutter-frame (38);
   and in that each shredder-blade is so arranged that the shredder-blade pivots radially outwards due to centrifugal force when the cutter-frame rotates.

4. Machine of claim 3, further characterised:
   in that the cutter-frame is provided with a set of rods (50) lying parallel to the axis (41) of the cutter-frame, whereby the cutter-frame (38) resembles a squirrel-cage;
   and in that the shredder-blades (52) are pivoted some to each of the said rods.

5. Machine of claim 4, further characterised:
   in that the said rods (50) are spaced radially away from the axis (41) of the cutter-frame by a substantial distance.

6. Machine of claim 1, further characterised:
   in that the cutter-frame includes a spindle (41), running the full axial length of the cutter-frame;
   in that the spindle is supported in bearings (40);
   in that there is a respective bearing, termed an end bearing, at each end of the spindle;
   and in that there are no further bearings on the spindle between the said end bearings.

7. Machine of claim 1, further characterised:
   in that the drive-means comprises a series of rollers (43,45).

8. Machine of claim 7, further characterised:
   in that the drive-means includes at least one respective roller each side of the cutter-frame (38).

9. Bale-shredding machine, characterized:
   in that the machine includes a frame;
   in that the machine includes a drive-means;
   in that the arrangement of the machine is such that, in use of the machine, a peripheral surface of the bale is in tangential driving engagement with the drive-means;
   in that the said driving engagement is such that, in use of the machine, the drive-means is effective to set the said peripheral surface in motion relative to the frame of the machine;
   in that the arrangement of the machine is such that the said motion of the peripheral surface results in the rotation of the bale about an axis of rotation, with respect to the frame;
   in that the machine includes a cutter-frame;
   in that the cutter-frame is mounted on bearings for rotation about an axis of rotation with respect to the frame of the machine;
   in that the axis of rotation of the cutter-frame is parallel to the axis of rotation of the bale;
   in that the cutter-frame is furnished with many shredder-blades;
   in that each shredder-blade comprises a respective flat piece of metal, one of the side edges (56) of which constitutes a cutting-edge;
   and in that each shredder-blade is so disposed that the plane of the blade lies radially, relative to the axis of the cutter-frame.

* * * * *